US009720785B1

(12) United States Patent
Cook et al.

(10) Patent No.: US 9,720,785 B1
(45) Date of Patent: Aug. 1, 2017

(54) VARIABLE CHECKPOINTING IN A STREAMING APPLICATION THAT INCLUDES TUPLE WINDOWS

(71) Applicant: International Business Machines Corporation, Armonk, NY (US)

(72) Inventors: Alexander Cook, Rocherster, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/294,404

(22) Filed: Oct. 14, 2016

(51) Int. Cl.
*G06F 11/14* (2006.01)
*G06F 17/30* (2006.01)

(52) U.S. Cl.
CPC .... *G06F 11/1461* (2013.01); *G06F 17/30516* (2013.01); *G06F 17/30958* (2013.01); *G06F 2201/805* (2013.01); *G06F 2201/84* (2013.01)

(58) Field of Classification Search
USPC .......................................................... 714/15
See application file for complete search history.

(56) References Cited

U.S. PATENT DOCUMENTS 6,154,876 A * 11/2000 Haley .................... G06F 11/366
714/38.1
6,332,199 B1 * 12/2001 Meth .................... G06F 11/1438
711/161
6,671,821 B1 * 12/2003 Castro ............... G06F 17/30212
707/E17.007
7,305,582 B1 * 12/2007 Moser ..................... G06F 9/526
714/11
8,527,650 B2    9/2013 Craft et al.
(Continued)

FOREIGN PATENT DOCUMENTS

WO    2013052562    4/2013

OTHER PUBLICATIONS

Ni et al., "ACR: Automatic Checkpoint/Restart for Soft and Hard Error Protection", in Proceedings of the International Conference on High Performance Computing, Networking, Storage and Analysis, pp. 1-12, 2013.
(Continued)

*Primary Examiner* — Kamini Patel
(74) *Attorney, Agent, or Firm* — Martin & Associates, LLC; Derek P. Martin

(57) ABSTRACT

A variable checkpoint mechanism in a streams manager checkpoints a streaming application based on periodic time periods for checkpoints. The variable checkpoint mechanism can take a checkpoint early before a periodic time period ends or late after the periodic time period ends based on predicted size of one or more tuple windows in the streaming application. The time for taking the checkpoint can be selected based on multiple checkpoint timing criteria, which include storage requirement for the checkpoint and predicted backpressure in the flow graph. In this manner the checkpoint timing of the variable checkpoint mechanism can be adjusted real-time to minimize the negative impact of checkpointing on the performance of the streaming application.

21 Claims, 6 Drawing Sheets

(56) References Cited

U.S. PATENT DOCUMENTS

| | | | | |
|---|---|---|---|---|
| 8,572,051 | B1* | 10/2013 | Chen | G06F 17/30445 707/687 |
| 8,943,366 | B2* | 1/2015 | Carey | G06F 11/0709 714/37 |
| 9,298,788 | B1* | 3/2016 | Kekre | H04L 67/00 |
| 9,471,438 | B1* | 10/2016 | Jacques Da Silva | G06F 11/1451 |
| 2006/0004860 | A1* | 1/2006 | Liedes | G06F 11/1471 |
| 2009/0106189 | A1* | 4/2009 | Jain | G06F 17/30516 |
| 2009/0106214 | A1* | 4/2009 | Jain | G06F 17/30516 |
| 2010/0293532 | A1* | 11/2010 | Andrade | G06F 11/1438 717/140 |
| 2012/0179809 | A1 | 7/2012 | Barsness et al. | |
| 2013/0031335 | A1 | 1/2013 | Santosuosso et al. | |
| 2013/0031556 | A1 | 1/2013 | Branson et al. | |
| 2013/0166948 | A1 | 6/2013 | Branson et al. | |
| 2013/0179591 | A1 | 7/2013 | Branson et al. | |
| 2014/0215184 | A1 | 7/2014 | Branson et al. | |
| 2014/0237134 | A1 | 8/2014 | Branson et al. | |
| 2014/0304545 | A1* | 10/2014 | Chen | G06F 9/3863 714/4.3 |
| 2014/0317448 | A1 | 10/2014 | Rash et al. | |
| 2014/0351233 | A1* | 11/2014 | Crupi | G06F 17/30516 707/706 |
| 2014/0373019 | A1 | 12/2014 | Branson et al. | |
| 2015/0370800 | A1 | 12/2015 | Branson et al. | |
| 2015/0370837 | A1* | 12/2015 | Branson | G06F 17/3053 707/748 |

OTHER PUBLICATIONS

Madsen et al., "Dynamic Resource Management in a Massively Parallel Stream Processing Engine", in Proceedings of the 24th ACM International on Conference on Information and Knowledge Management, pp. 13-22, 2015.

Zheng, Fang, "Incremental Checkpointing in Streams V4.1", Dec. 2, 2015.

Cook et al., "Variable Checkpointing in a Streaming Application With One or More Consistent Regions", U.S. Appl. No. 15/294,367, filed Oct. 14, 2016.

Appendix P—List of IBM Patents or Patent Applications Treated As Related, dated Mar. 15, 2017.

* cited by examiner

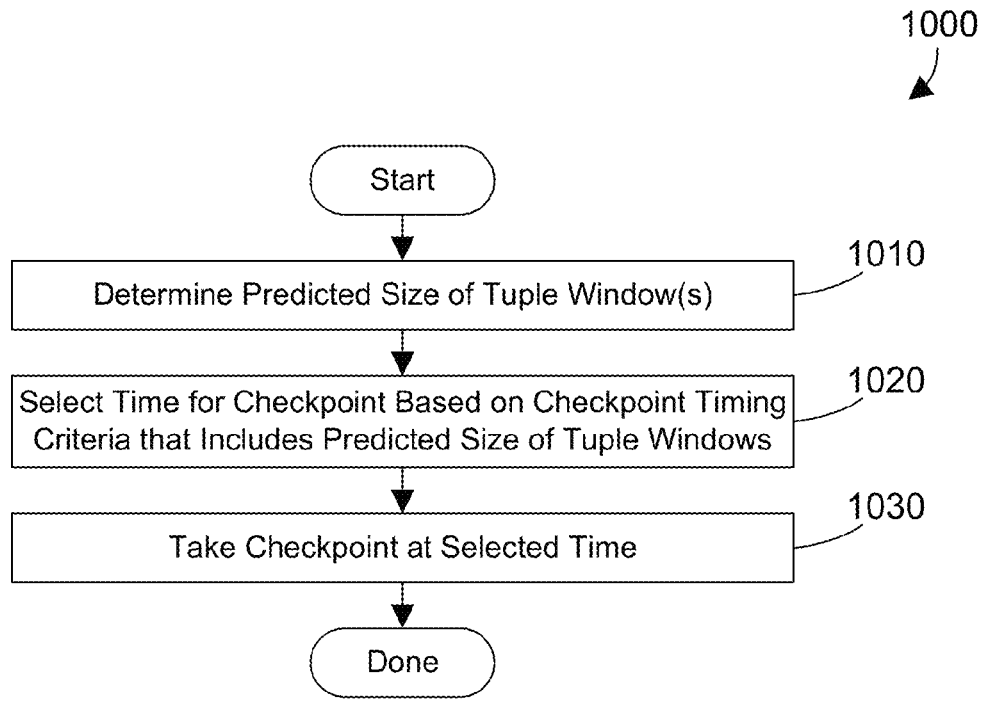

FIG. 10

| Checkpoint Timing Criteria |
|---|
| Time is at least X from Time of Last Checkpoint, Select Time when Predicted Size of Tuple Window(s) Results in Minimum Storage Requirement — 1110 |
| Time is within ADTP, Select Time when Predicted Size of Tuple Window(s) Results in Minimum Storage Requirement — 1120 |
| Time is within ADTP, Select Time when Predicted Size of Tuple Window(s) Results in Smallest Storage Requirement when there is No Predicted Backpressure — 1130 |
| Time is within ADTP, Select Time based on Tradeoff Between Storage Requirement and Predicted Backpressure — 1140 |

FIG. 11

VARIABLE CHECKPOINTING IN A STREAMING APPLICATION THAT INCLUDES TUPLE WINDOWS

BACKGROUND

1. Technical Field

This disclosure generally relates to streaming applications, and more specifically relates to checkpointing streaming applications that have one or more tuple windows.

2. Background Art

Streaming applications are known in the art, and typically include multiple processing elements coupled together in a flow graph that process streaming data in near real-time. A processing element typically takes in streaming data in the form of data tuples, operates on the data tuples in some fashion, and outputs the processed data tuples to the next processing element. Streaming applications are becoming more common due to the high performance that can be achieved from near real-time processing of streaming data.

Checkpointing is well-known in the art of computer programs as the process of saving the state of a computer program periodically as it runs so the state of the computer program can be restored should a failure occur. Checkpointing a streaming application brings some additional challenges, because the performance cost of checkpointing can often negatively affect the performance of a streaming application, which typically needs to process a data stream in near real-time. It is known in the art of streaming applications to checkpoint periodically, meaning a full checkpoint is taken at set time intervals. Thus, if the selected time interval is 30 seconds, this means every 30 seconds the streaming application will create a checkpoint of the state of the processing elements in the flow graph.

Because checkpointing can negatively affect the performance of streaming applications, incremental checkpoints have been developed that allow taking a full checkpoint, followed by multiple "delta checkpoints" that reflect the changes since the last checkpoint, whether a full checkpoint or another delta checkpoint. Delta checkpoints are typically much smaller than full checkpoints, which affects the performance of the streaming application less than when full checkpoints are taken at each periodic interval.

Some streaming applications have tuple windows. Checkpointing applications that have tuple windows can result in significant overhead in taking a checkpoint when the tuple window size is large, meaning many tuples are within the tuple window. Forcing a checkpoint at a periodic time period could result in having to checkpoint many tuples in a tuple window, which will negatively impact performance of the streaming application.

BRIEF SUMMARY

A variable checkpoint mechanism in a streams manager checkpoints a streaming application based on periodic time periods for checkpoints. The variable checkpoint mechanism can take a checkpoint early before a periodic time period ends or late after the periodic time period ends based on predicted size of one or more tuple windows in the streaming application. The time for taking the checkpoint can be selected based on multiple checkpoint timing criteria, which include storage requirement for the checkpoint and predicted backpressure in the flow graph. In this manner the checkpoint timing of the variable checkpoint mechanism can be adjusted real-time to minimize the negative impact of checkpointing on the performance of the streaming application.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a flow diagram of a method for taking checkpoints at variable times based on predicted size of one or more tuple windows; and FIG. 11 is a table that shows sample checkpoint timing criteria that can be used to select a time for performing a checkpoint.

DETAILED DESCRIPTION

The disclosure and claims herein are directed to a variable checkpoint mechanism in a streams manager that checkpoints a streaming application based on periodic time periods for checkpoints. The variable checkpoint mechanism can take a checkpoint early before a periodic time period ends or late after the periodic time period ends based on predicted size of one or more tuple windows in the streaming application. The time for taking the checkpoint can be selected based on multiple checkpoint timing criteria, which include storage requirement for the checkpoint and predicted backpressure in the flow graph. In this manner the checkpoint timing of the variable checkpoint mechanism can be adjusted real-time to minimize the negative impact of checkpointing on the performance of the streaming application.

Figure 1:
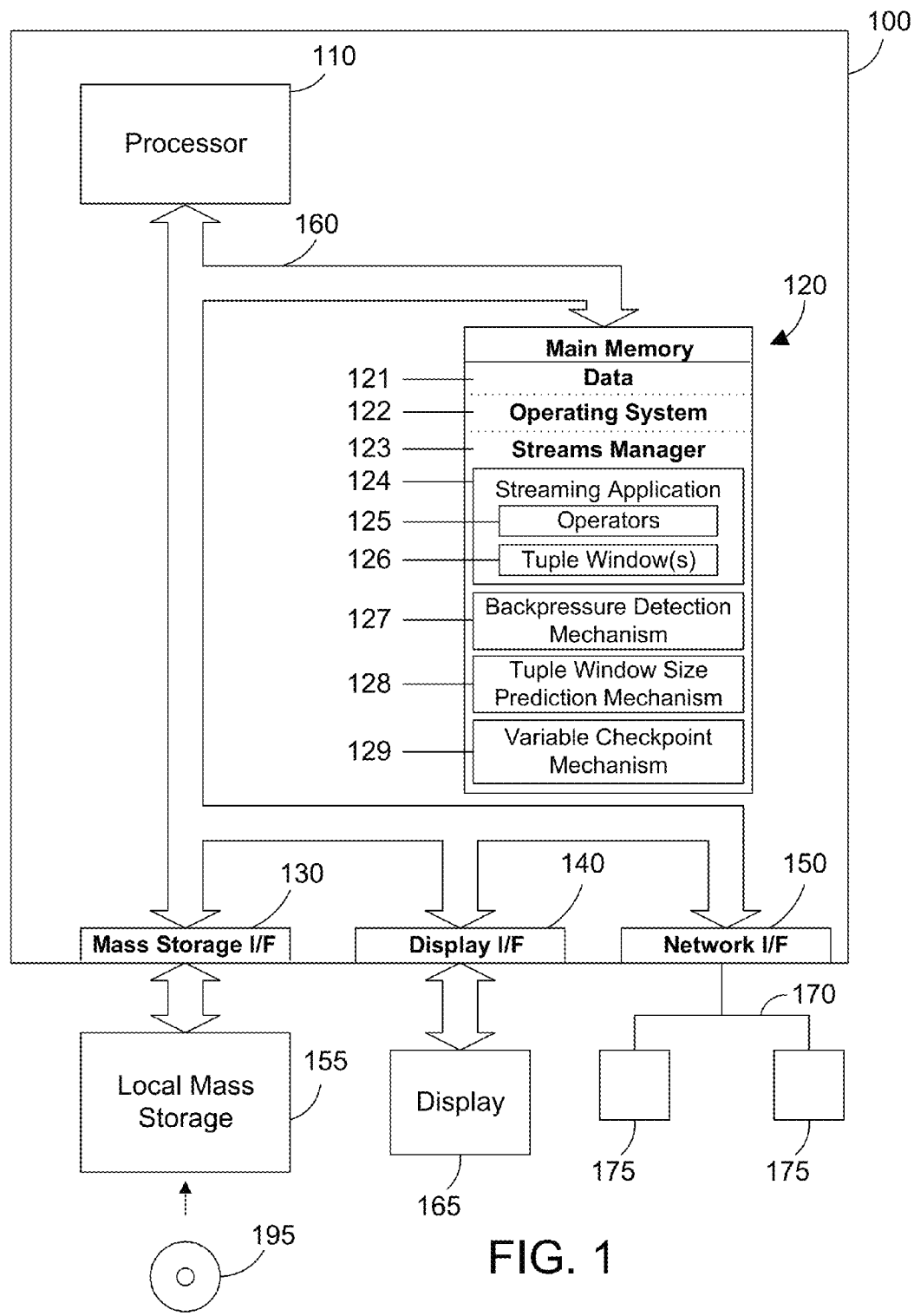
FIG. 1 is a block diagram of a computer system that includes a variable checkpoint mechanism in a streams manager that can adjust the time of taking checkpoints based on conditions in the streaming application.

Referring to FIG. 1, a computer system 100 is one suitable implementation of a server computer system that includes a variable checkpoint mechanism in a streams manager as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a run-time environment that executes a streaming application 124. The streaming application 124 preferably comprises a flow graph that includes processing elements that include operators 125 that process data tuples. The streaming application 124 preferably includes one or more tuple windows 126. Tuple windows are discussed in more detail below with reference to FIGS. 4-6. As discussed in the Background section above, using the periodic checkpointing known in the art can result in significant performance penalties when a checkpoint is forced at a time when one or more tuple windows are large. As a result, the streams manager 123 includes a variable checkpoint mechanism 129 that can perform checkpointing at different times than at the end of the normal periodic time periods when conditions in the streaming application are such that advancing or delaying the time for taking a checkpoint is beneficial based on predicted size of one or more tuple windows 126.

The streams manager 123 includes a backpressure detection mechanism 127 that detects when one or more operators 125 in the streaming application have backpressure. Backpressure means an operator has a backup of multiple data tuples to process due to the operator processing the data tuples more slowly than the data tuples are arriving at the input of the operator. The backpressure detection mechanism 127 monitors backpressure in the streaming application 124. The variable checkpoint mechanism 129 can use information from the backpressure detection mechanism 127 to take a checkpoint at a time other than at the end of periodic time period based on backpressure in one or more regions of the flow graph, which avoids the performance cost of performing checkpointing at a time when there is backpressure in one or more regions of the flow graph.

Figure 7:
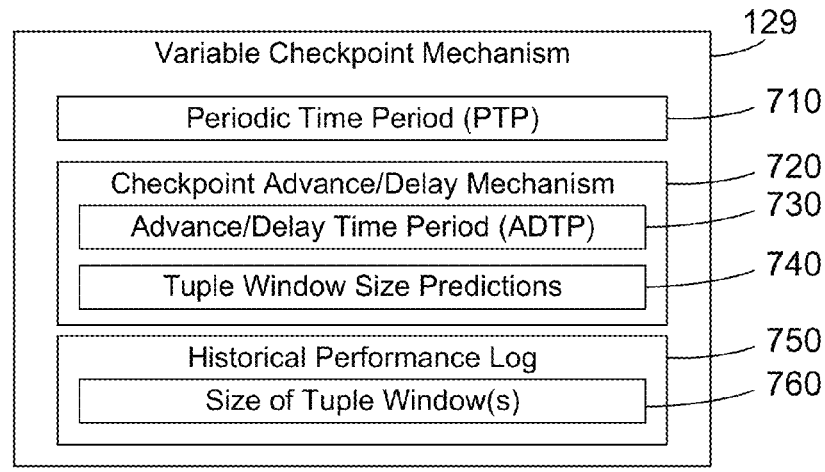
FIG. 7 shows possible details of the variable checkpoint mechanism 129 shown in FIG. 1.

The streams manager 123 includes a tuple window size prediction mechanism 128 that can predict size of the one or more tuple windows 126 based on information in a historical performance log, such as 750 shown in FIG. 7. For example, the historical performance log could indicate that large tuple windows occur in a periodic pattern, thereby allowing the tuple window size prediction mechanism 128 to accurately predict when a tuple window is large and when a tuple window is small. By predicting size of tuple windows using tuple window size prediction mechanism 128, the variable checkpoint mechanism 129 can adjust the time for performing a checkpoint so the checkpoint is completed at a selected time other than the end of a periodic time period such that the size of the tuple window(s) 126 that is less than the size of the tuple window(s) 126 at the end of the periodic time period.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124.

Although computer system 100 is shown to contain only a single processor and a single system bus, those skilled in the art will appreciate that a variable checkpoint mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
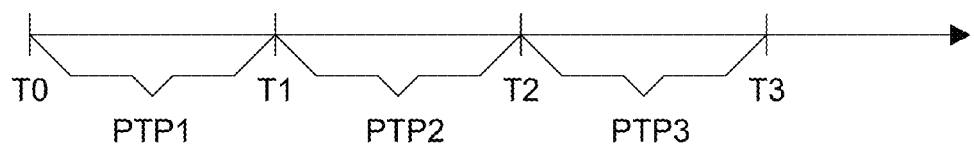
FIG. 2 is a timeline showing checkpointing at periodic time periods.

FIG. 2 shows a timeline that illustrates performing checkpoints at times defined by a periodic time period. T0 represents when the streaming application begins to execute. PTP1 represents a first periodic time period, which begins at T0 and ends at T1. PTP2 represents a second periodic time period, which begins at T1 and ends and T2. PTP3 represents a third periodic time period, which begins at T2 and ends at T3. In this specific example, checkpoints are taken at the end of each periodic time period, which means at T1 (the end of PTP1), at T2 (the end of PTP2), and at T3 (the end of PTP3). The timeline in FIG. 2 simply shows that checkpoints are performed based on a defined periodic time period that is of the same duration for each time period.

Figure 3:
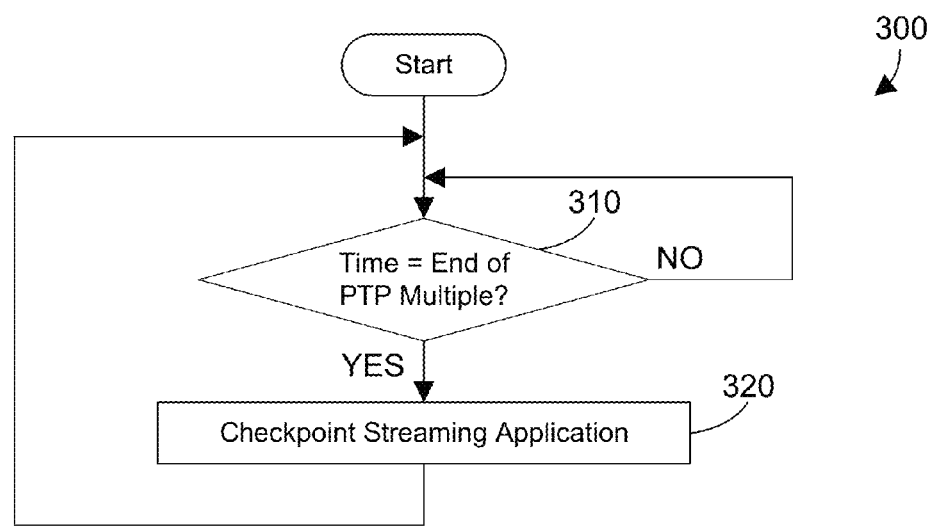
FIG. 3 is a flow diagram of a method for performing the checkpointing at periodic time periods shown in FIG. 2.

Referring to FIG. 3, a method 300 represents how checkpointing as shown in the timeline in FIG. 2 is performed. When the current time is not at the end of a multiple of the periodic time period PTP (step 310=NO), method 300 loops back until the current time is the end of a multiple of the PTP (step 310=YES), at which point the streaming application is checkpointed (step 320). Method 300 then loops back and continues, checkpointing the streaming application (step 320) each time the current time is at the end of a multiple of the periodic time period PTP (step 310=YES).

Performing checkpoints at rigid time intervals defined by a periodic time period can result in the need to perform a checkpoint at times that can significantly impact system performance. A purpose of the variable checkpoint mechanism disclosed and claimed herein is to provide flexibility to advance or delay checkpointing according to either predicted conditions or actual conditions in the streaming application.

Examples are now provided to describe various different types of tuple windows known in the art of streaming applications. Note that a single tuple window can be defined within a single operator, multiple tuple windows can be defined where each is within a different operator, a single tuple window can be defined to span multiple operators, multiple tuple windows can be defined where each is either within an operator or spans multiple operators, or a single tuple window can be defined for the entire streaming application. These and other variations are within the scope of the disclosure and claims herein.

The size of tuple windows is typically a function of the eviction policy for the tuple windows. Different types of tuple windows are known in the art, including tumbling windows, hopping windows, and sliding windows. Each of these is illustrated in FIGS. 4-6.

Figure 4:
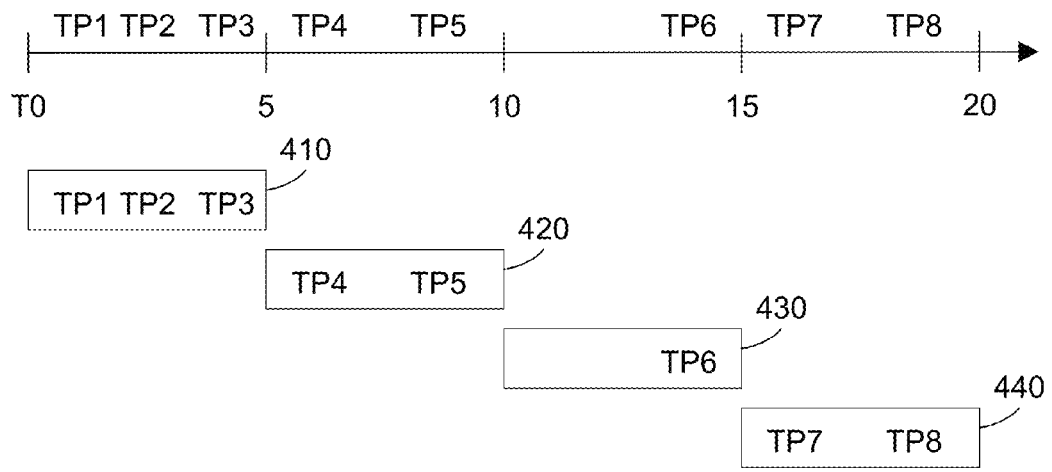
FIG. 4 shows a sample timeline of data tuples, and resulting tumbling tuple windows for these data tuples.

FIG. 4 shows a sample timeline with five second intervals, with tumbling tuple windows shown below the timeline. Tumbling tuple windows are windows that each include one or more tuples, with an eviction policy that flushes data tuples when a trigger condition is reached. The tumbling tuple windows shown in FIG. 4 are five seconds long. A first tuple window 410 includes three tuples TP1, TP2 and TP3, and therefore has a tuple window size of three. A second tuple window 420 includes two tuples TP4 and TP5, and therefore has a tuple window size of two. A third tuple window 430 includes a single tuple TP6, and therefore has a tuple window size of one. A fourth tuple window 440 includes two tuples TP7 and TP8, and therefore has a tuple window size of two. This simple example shows that if a checkpoint is taken during window 410, all three tuples TP1, TP2 and TP3 will have to be checkpointed. If, however, a checkpoint is taken during window 430, only a single tuple TP6 will have to be checkpointed. This illustrates that the window size, meaning the number of tuples in a window, can affect performance of checkpointing, which in turn affects performance of a streaming application.

Figure 5:
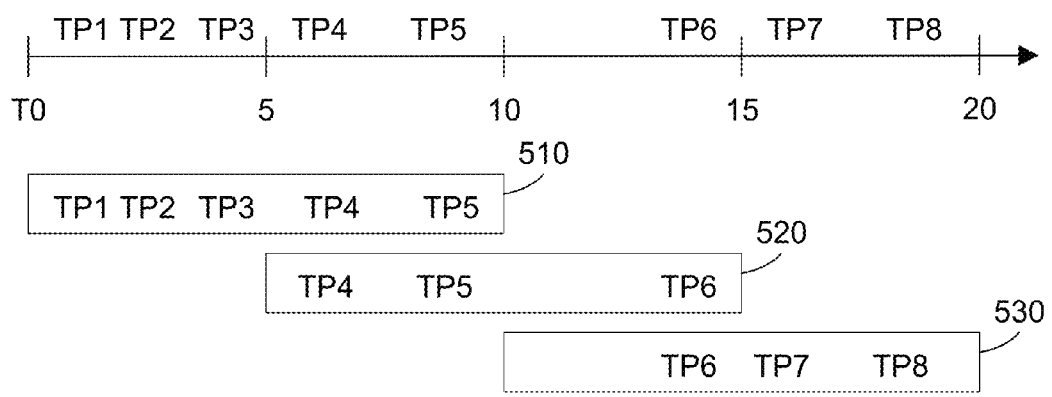
FIG. 5 shows a sample timeline of data tuples, and resulting hopping tuple windows for these data tuples.

FIG. 5 shows the same sample timeline with five second intervals shown in FIG. 4, with hopping tuple windows shown below the timeline. Hopping tuple windows are windows that each span more than one interval, with an eviction policy that flushes data tuples from a window after some criteria is met, such as having been in two tuple windows. The hopping tuple windows shown in FIG. 5 span ten seconds and overlap each other. The first hopping tuple window 510 includes five tuples TP1, TP2, TP3, TP4 and TP5, and therefore has a window size of five. The second hopping tuple window 520 includes three tuples TP4, TP5 and TP6, and therefore has a window size of three. The third hopping tuple window 530 includes three tuples TP6, TP7 and TP8, and therefore has a window size of three. This simple example shows that if a checkpoint is taken during tuple window 510, all five tuples TP1, TP2, TP3, TP4 and TP5 will have to be checkpointed. If, however, a checkpoint is taken during tuple window 520 or tuple window 530, only three tuples will have to be checkpointed. This illustrates that the window size, meaning the number of tuples in a window, can affect performance of checkpointing, which in turn affects performance of a streaming application.

Figure 6:
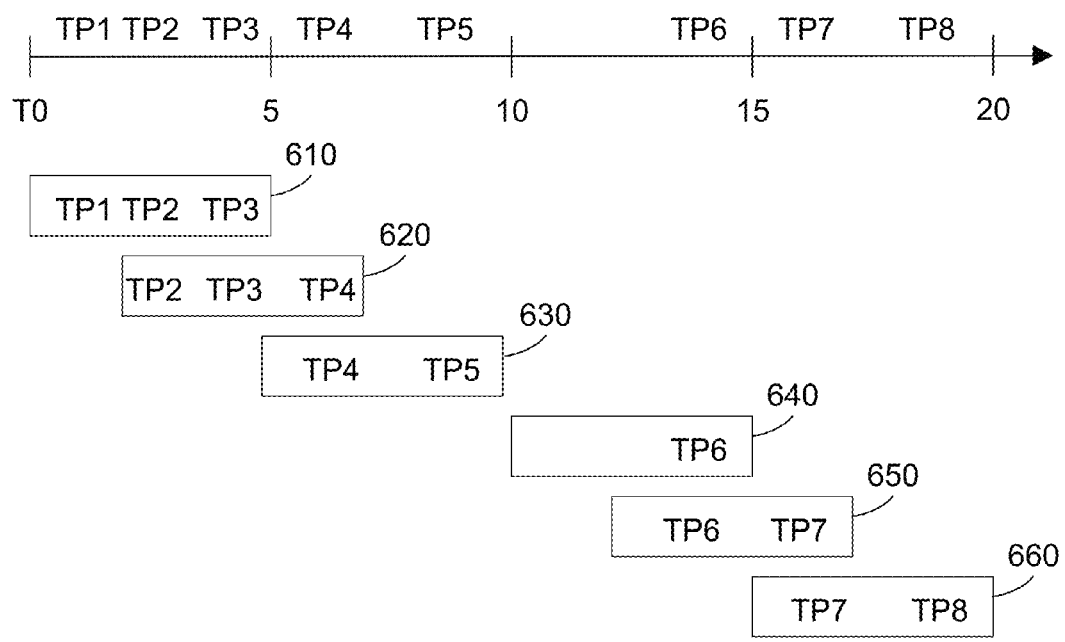
FIG. 6 shows a sample timeline of data tuples, and resulting sliding tuple windows for these data tuples.

FIG. 6 shows the same sample timeline with five second intervals shown in FIGS. 4 and 5, with sliding tuple windows shown below the timeline. Sliding tuple windows are windows have the same length, such as 5 seconds in FIG. 5, but slide along the timeline to include different tuples as time advances according to a specified eviction policy. The sliding tuple windows shown in FIG. 6 span five seconds and can overlap each other. The first sliding tuple window 610 includes three tuples TP1, TP2 and TP3, and therefore has a window size of three. The second sliding tuple window 620 includes three tuples TP2, TP3 and TP4, and therefore has a window size of three. The third sliding tuple window 630 includes two tuples TP4 and TP5, and therefore has a window size of two. The fourth sliding tuple window 640 includes a single tuple TP6, and therefore has a window size of one. The fifth sliding tuple window 650 includes two tuples TP6 and TP7, and therefore has a window size of two. The sixth sliding tuple window 660 includes two tuples TP7 and TP8, and therefore has a window size of two. This simple example shows that if a checkpoint is taken during tuple window 610, all three tuples TP1, TP2 and TP3 will have to be checkpointed. If, however, a checkpoint is taken during tuple window 640, only one tuple will have to be checkpointed. This illustrates that the window size, meaning the number of tuples in a window, can affect performance of checkpointing, which in turn affects performance of a streaming application.

As used in the specification and claims herein, the term "tuple window" includes any suitable grouping of one or more data tuples that are adjacent in time or sequence in the stream, which includes tumbling windows, hopping windows, sliding windows, and which also extends to other types of windows whether currently known or developed in the future. A tuple window can be within a single operator, can span multiple operators, or can span an entire streaming application. Note also the term "size of a tuple window" as used herein refers to a number of tuples within the window, not to a time duration of the tuple window. Thus, different tuple windows that have the same time duration can have different sizes, as shown in the examples in FIGS. 4-6.

Referring to FIG. 7, the variable checkpoint mechanism 129 in FIG. 1 is shown with additional details. The variable checkpoint mechanism 129 includes a periodic time period PTP 710. This time period is similar to the periodic time period shown in FIG. 2 and referenced in FIG. 3, and most preferably comprises a time interval for performing checkpointing, such as 30 seconds. In the specific examples shown herein, the periodic time period is the same duration for all periodic time periods. Note, however, the periodic time periods could have different durations within the scope of the disclosure and claims herein. Using the example of a periodic time period of 30 seconds that is the same duration for all periodic time periods, the variable checkpoint mechanism 129 will take a checkpoint every 30 seconds unless conditions warrant advancing or delaying the taking of the checkpoint, as discussed in more detail below.

Figure 8:
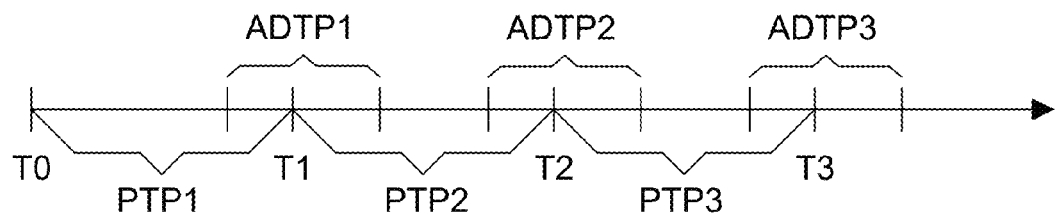
FIG. 8 is a timeline showing a time period that spans before and after the end of each periodic time period that allows adjusting checkpointing to be at different times than at the end of the periodic time periods.
Figure 9:
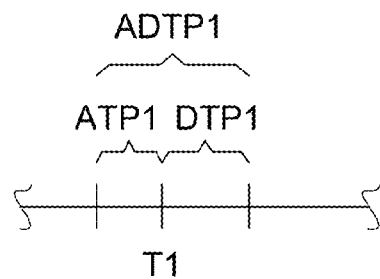
FIG. 9 is a partial timeline showing ADTP1 from FIG. 8 in more detail.

A checkpoint advance/delay mechanism 720 can advance a checkpoint to take the checkpoint early before the end of a periodic time period, or can delay a checkpoint to take the checkpoint late after the end of the period time period, based on one or more tuple window size predictions 740. In one suitable implementation, the checkpoint advance/delay mechanism 720 defines an advance/delay time period 730 during which a checkpoint may be performed. The timeline in FIG. 2 is shown in FIG. 8 with the addition of three advance/delay time periods ADTP1, ADTP2 and ADTP3 that each span a time period that starts before the end of a periodic time period and ends after the end of the periodic time period. The advance/delay time period in one implementation can be considered to be made up of an advance time period and a delay time period. Thus, as shown in FIG. 9, advance/delay time period ADTP1 in FIG. 8 is comprised of an advance time period ATP1 before the end T1 of PTP1 and a delay time period DTP1 after the end T1 of PTP1. Note, however, the advance/delay time period could specify an advance time period without a delay time period, or could specify a delay time period without an advance time period. These and other modifications are within the scope of the disclosure and claims herein.

The variable checkpoint mechanism 129 may also include a historical performance log 750. Note this log could be part of the variable checkpoint mechanism 129, or could be part of the streaming application 124 shown in FIG. 1. The historical performance log 750 logs the performance of one or more operators 125 in one or more processing elements. In addition, the historical performance log 750 preferably includes size of tuple windows 760 over time. The size of tuple windows 760 allows the tuple window size prediction mechanism 128 to make one or more tuple window size predictions 740 when patterns in tuple window size is apparent in the size of the tuple window(s) 760 in the historical performance log 750. The tuple window size predictions 740 thus predict size of one or more tuple windows at multiple times in the future so the variable checkpoint mechanism can make more intelligent decisions regarding when to checkpoint the streaming application to maximize the run-time performance of the streaming application by minimizing the time for taking a checkpoint according to the tuple windows size predictions 740.

Referring to FIG. 10, a method 1000 is preferably performed by the variable checkpoint mechanism 129 shown in FIG. 1. Method 1000 determines predicted size of one or more tuple windows (step 1010). A time for a checkpoint is selected based on checkpoint timing criteria that includes the predicted size of tuple windows at different points in time (step 1020). The checkpoint is then taken at the selected time (step 1030). Method 1000 is then done.

The checkpoint timing criteria 1020 referenced in FIG. 10 can be any suitable criteria, combination of criteria, algorithm or heuristic. FIG. 11 shows a table 1100 with four examples of defined checkpoint timing criteria. Checkpoint timing criteria 1110 specifies that when the time is at least a specified time X from the time of the last checkpoint, select a future time with the predicted size of one or more tuple window(s) results in a minimum storage requirement. Note the size of a tuple window can be roughly proportional to storage requirements for taking a checkpoint. Thus, a tuple window that has three tuples could take roughly three times the storage for a checkpoint when compared to a tuple window that has one tuple. Note the comparisons are made at different times for the same tuple window, not between different tuple windows in the flow graph. Checkpoint criteria 1110 allows great flexibility in selecting a time for a checkpoint, as long as a defined amount of time X has passed since the last checkpoint.

Checkpoint timing criteria 1120 shown in FIG. 11 specifies that when the time is within the advance/delay time period 730 shown in FIG. 7, select a future time when predicted size of one or more tuple windows results in a minimum storage requirement. Note the storage requirement for a checkpoint is a function of all tuple windows that are included in the checkpoint. Note also that not all tuple windows will have similar storage requirements. Thus, a first tuple window could be defined for tuples that include 500 megabytes of data, which means a tuple window that includes three tuples will require 1,500 megabytes. A second tuple window could be defined for a different portion of the flow graph for tuples that include 5 megabytes of data, which means a tuple window that includes three tuples will required 15 megabytes of data. This shows that window size is not the only consideration, because the window size does not indicate a storage requirement for each tuple in the window. A simple example will illustrate based on the two examples above, where a first tuple window includes tuples that have 500 megabytes of data and a second tuple window includes tuples that have 5 megabyes of data. Let's assume using checkpoint timing criteria 1120 that at a time T1 in the future the first tuple window has an estimated size of three and the second tuple window has an estimated size of 200. The estimated storage requirement for the checkpoint at time T1 will be (3×500 MB)+(200×5 MB)=2,500 MB. Let's further assume at a time T2 in the future the first tuple window has an estimated size of one and the second tuple window has an estimated size of 300. The estimated storage requirement for the checkpoint at time T2 will be (1×500)+(300×5)=2,000 MB. Thus, even though the predicted window size for the first tuple window at T2 is only two less than at T1, and the second tuple window at T2 is 100 more than at T1, the estimated storage requirement at T2 is less than at T1, so time T2 will be selected as the checkpoint time. This example is very simplified to illustrate that tuple window size is not the final inquiry, because the storage requirements of a checkpoint are a function of both tuple window size and tuple size.

Checkpoint timing criteria 1130 shown in FIG. 11 specifies that when the time is within the advance/delay time period 730 shown in FIG. 7, select a future time when the predicted size of the tuple window(s) results in the smallest storage requirement when there is no predicted backpressure. Criteria 1130 puts a premium on avoiding checkpointing when there is predicted backpressure, because suffering the performance penalty of taking a checkpoint during a time of backpressure will typically make the backpressure worse. Note that "predicted backpressure" as used herein can mean backpressure predicted in any suitable portion or multiple portions of the flow graph, including a single operator, a group of operators, a consistent region, etc. When there is predicted backpressure, checkpointing is avoided if it can be done during a time when there is no predicted backpressure. A simple example will illustrate. Let's assume a checkpoint at time T1 is estimated to take 24 MB of storage, and at time T1 there is predicted backpressure on an operator that produces tuples in the tuple window. Let's further assume a checkpoint at time T2 is estimated to take 37 MB of storage, and at time T2 there is no predicted backpressure on the same operator. Based on checkpoint timing criteria 1130, time T2 will be selected for the checkpoint instead of T1 because there is no backpressure at T2. Note T2 is selected even though the storage requirement for T2 is greater than for T1.

Checkpoint timing criteria 1140 shown in FIG. 11 specifies that when the time is within the advance/delay time period 730 shown in FIG. 7, select a future time based on a tradeoff between storage requirement and predicted backpressure. This allows quantifying the predicted backpressure. Thus, if the predicted backpressure is slight but the storage requirement is much less, a time for the checkpoint can be selected that includes predicted backpressure. A simple example will illustrate. If a first time T1 has no predicted backpressure with a storage requirement of 50 MB, and a second time T2 has slight predicted backpressure with a storage requirement of 2 MB, the second time T2 could be chosen by trading off the substantial savings in storage from 50 MB to 2 MB against the small difference between no backpressure and slight backpressure. Of course, what constitutes slight, moderate or heavy backpressure can be defined in any suitable way.

The checkpoint timing criteria 1100 shown in FIG. 11 are shown by way of example, and are not limiting. The disclosure and claims herein extend to using any suitable criteria for selecting a time for a checkpoint that is different than an end of a periodic time period based on a predicted size of one or more tuple windows.

The examples discussed herein are extremely simplified for the purpose of illustration, and are not intended to be limiting. One skilled in the art will recognize many variations are possible within the scope of the disclosure and claims herein.

A variable checkpoint mechanism in a streams manager checkpoints a streaming application based on periodic time periods for checkpoints. The variable checkpoint mechanism can take a checkpoint early before a periodic time period ends or late after the periodic time period ends based on predicted size of one or more tuple windows in the streaming application. The time for taking the checkpoint can be selected based on multiple checkpoint timing criteria, which include storage requirement for the checkpoint and predicted backpressure in the flow graph. In this manner the checkpoint timing of the variable checkpoint mechanism can be adjusted real-time to minimize the negative impact of checkpointing on the performance of the streaming application.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streams manager residing in the memory and executed by the at least one processor, the streams manager executing a streaming application that comprises a flow graph that includes a plurality of operators that process a plurality of data tuples, wherein the flow graph defines at least one tuple window that each comprises at least one of the plurality of data tuples; and
   a checkpoint mechanism that uses a plurality of periodic time periods for taking checkpoints, and dynamically adjusts a time for taking a checkpoint to be at a selected time different than at an end of one of the plurality of periodic time periods based on predicted size of the at least one tuple window in the streaming application, wherein the predicted size of the at least one tuple window determines a storage requirement for taking the checkpoint, wherein the checkpoint mechanism selects the selected time for taking the checkpoint based on the storage requirement for taking the checkpoint and based on predicted backpressure in at least one portion of the flow graph.

2. The apparatus of claim 1 wherein the checkpoint mechanism selects the selected time when the storage requirement for taking the checkpoint is at a minimum and there is no predicted backpressure in the at least one portion of the flow graph.

3. The apparatus of claim 1 wherein a first of the at least one tuple window comprises a tuple window within one of the plurality of operators in the flow graph.

4. The apparatus of claim 1 wherein a second of the at least one tuple window comprises a tuple window that spans multiple of the plurality of operators in the flow graph.

5. The apparatus of claim 1 wherein each of the plurality of period time periods has a same duration.

6. The apparatus of claim 1 further comprising a tuple window size prediction mechanism that predicts a size for each of the at least one tuple window at different points in time based on a historical performance log that indicates past performance of the streaming application including tuple window size.

7. An apparatus comprising:
   at least one processor;
   a memory coupled to the at least one processor;
   a streams manager residing in the memory and executed by the at least one processor, the streams manager executing a streaming application that comprises a flow graph that includes a plurality of operators that process a plurality of data tuples, wherein the flow graph defines at least one tuple window that each comprises at least one of the plurality of data tuples; and
   a checkpoint mechanism that uses a plurality of periodic time periods for taking checkpoints, and dynamically adjusts a time for taking a checkpoint to be at a selected time different than at an end of one of the plurality of periodic time periods based on predicted size of the at least one tuple window in the streaming application, wherein the checkpoint mechanism defines an advance/delay time period that comprises a first time period before an end of each periodic period and a second time period after the end of each periodic time period, and selects the selected time for taking the checkpoint within the advance/delay time period.

8. The apparatus of claim 7 wherein a first of the at least one tuple window comprises a tuple window within one of the plurality of operators in the flow graph.

9. The apparatus of claim 7 wherein a second of the at least one tuple window comprises a tuple window that spans multiple of the plurality of operators in the flow graph.

10. The apparatus of claim 7 wherein each of the plurality of period time periods has a same duration.

11. A computer-implemented method executed by at least one processor for running streaming applications, the method comprising:
    executing a streams manager that executes a streaming application that comprises a flow graph that includes a plurality of processing elements that process a plurality of data tuples, wherein the flow graph defines at least one tuple window that each comprises at least one of the plurality of data tuples;
    defining a plurality of periodic time periods for taking checkpoints; and
    dynamically adjusting a time for taking a checkpoint to be at a selected time different than at an end of one of the plurality of periodic time periods based on predicted size of the at least one tuple window in the streaming application, wherein the predicted size of the at least one tuple window determines a storage requirement for taking the checkpoint, and selecting the selected time for taking the checkpoint based on the storage requirement for taking the checkpoint and based on predicted backpressure in at least one portion of the flow graph.

12. The method of claim 11 wherein the selected time is when the storage requirement for taking the checkpoint is at a minimum and there is no predicted backpressure in the at least one portion of the flow graph.

13. The method of claim 11 wherein a first of the at least one tuple window comprises a tuple window within one of the plurality of operators in the flow graph.

14. The method of claim 11 wherein a second of the at least one tuple window comprises a tuple window that spans multiple of the plurality of operators in the flow graph.

15. The method of claim 11 wherein each of the plurality of period time periods has a same duration.

16. The method of claim 11 further comprising predicting a size for each of the at least one tuple window at different points in time based on a historical performance log that indicates past performance of the streaming application including tuple window size.

17. A computer-implemented method executed by at least one processor for running streaming applications, the method comprising:
    executing a streams manager that executes a streaming application that comprises a flow graph that includes a plurality of processing elements that process a plurality of data tuples, wherein the flow graph defines at least one tuple window that each comprises at least one of the plurality of data tuples;
    defining a plurality of periodic time periods for taking checkpoints;
    defining an advance/delay time period that comprises a first time period before an end of each periodic period and a second time period after the end of each periodic time period;
    dynamically adjusting a time for taking a checkpoint to be at a selected time different than at an end of one of the plurality of periodic time periods based on predicted size of the at least one tuple window in the streaming application, wherein the selected time for taking the checkpoint is within the advance/delay time period.

18. The method of claim 17 wherein a first of the at least one tuple window comprises a tuple window within one of the plurality of operators in the flow graph.

19. The method of claim 17 wherein a second of the at least one tuple window comprises a tuple window that spans multiple of the plurality of operators in the flow graph.

20. The method of claim 17 wherein each of the plurality of period time periods has a same duration.

21. A computer-implemented method executed by at least one processor for running streaming applications, the method comprising:
    executing a streams manager that executes a streaming application that comprises a flow graph that includes a plurality of processing elements that process a plurality of data tuples, wherein the flow graph defines at least one tuple window that each comprises at least one of the plurality of data tuples, wherein a first of the at least one tuple window comprises a tuple window within one of the plurality of operators in the flow graph and a second of the at least one tuple window comprises a tuple window that spans multiple of the plurality of operators in the flow graph;
    defining a plurality of periodic time periods for taking checkpoints, wherein each of the plurality of period time periods has a same duration;
    defining an advance/delay time period that comprises a first time period before an end of each periodic period and a second time period after the end of each periodic time period;
    predicting a size for each of the at least one tuple window at different points in time based on a historical performance log that indicates past performance of the streaming application including tuple window size; and
    selecting a time for taking the checkpoint within the advance/delay time period to be at a selected time different than at an end of one of the plurality of periodic time periods based on predicted size of the at least one tuple window in the streaming application, wherein the predicted size of the at least one tuple window determines a storage requirement for taking the checkpoint, wherein the selected time for taking the checkpoint is selected when the storage requirement for taking the checkpoint is at a minimum and there is no predicted backpressure in at least one portion of the flow graph.

* * * * *